United States Patent
Semnisky et al.

(10) Patent No.: US 11,571,759 B2
(45) Date of Patent: Feb. 7, 2023

(54) CUTTING TOOL WITH DIRECTED FLUID FLOW TO FACILITATE CHIP EVACUATION

(71) Applicant: Kennametal Inc., Latrobe, PA (US)

(72) Inventors: Logan M. Semnisky, Latrobe, PA (US); Alan J. Bookheimer, Greensburg, PA (US); Ingo Grillenberger, Fürth (DE); Dominik Schmid, Fürth (DE)

(73) Assignee: KENNAMETAL INC., Latrobe, PA (US)

(*) Notice: Subject to any disclaimer, the term of this patent is extended or adjusted under 35 U.S.C. 154(b) by 55 days.

(21) Appl. No.: 17/116,782

(22) Filed: Dec. 9, 2020

(65) Prior Publication Data

US 2022/0176480 A1    Jun. 9, 2022

(51) Int. Cl.
*B23D 77/00*  (2006.01)

(52) U.S. Cl.
CPC ........ *B23D 77/006* (2013.01); *B23D 2277/30* (2013.01); *B23D 2277/46* (2013.01)

(58) Field of Classification Search
CPC .............. B23D 77/006; B23D 2277/30; B23D 2277/46
See application file for complete search history.

(56) References Cited

U.S. PATENT DOCUMENTS

| | | |
|---|---|---|
| 5,135,337 A | 8/1992 | Adamson |
| 5,152,640 A | 10/1992 | Regis et al. |
| 5,605,420 A | 2/1997 | Feldsine |
| 5,921,727 A * | 7/1999 | Depperman ........... B23D 77/02 408/145 |
| 5,934,842 A | 8/1999 | Gupta |
| 6,120,218 A | 9/2000 | Bishop |
| 6,655,883 B2 | 12/2003 | Maar |
| 6,913,428 B2 * | 7/2005 | Kress .................... B23D 77/02 408/83 |

(Continued)

FOREIGN PATENT DOCUMENTS

| | | |
|---|---|---|
| CN | 209139934 U | 7/2019 |
| DE | 19934125 | 1/2001 |

(Continued)

OTHER PUBLICATIONS

Jan. 29, 2021 Search report EP App. No 20190517.1.
(Continued)

*Primary Examiner* — Eric A. Gates
(74) *Attorney, Agent, or Firm* — Larry R. Meenan

(57) ABSTRACT

A cutting tool, such as a reamer, includes a rear machine connection member, a center tube, a front cutting ring, and a rear cutting ring. The front cutting ring includes a sleeve member and one or more cutting head assemblies. Each cutting head assembly includes at least one support arm extending radially outwardly from a rotational axis, RA, of the cutting tool, and a cutting head supported by the at least one support arm. The at least one support arm of the cutting head assembly defines a fluid dynamic structure for directing fluid flow in a desired direction to facilitate chip evacuation during a cutting operation. The fluid dynamic structure can be an airfoil, a turbine blade, or similar structure that produces a directed fluid flow.

21 Claims, 13 Drawing Sheets

(56) References Cited

U.S. PATENT DOCUMENTS

| | | | |
|---|---|---|---|
| 8,764,354 B2 * | 7/2014 | Schuffenhauer | B23C 5/10 |
| | | | 408/59 |
| 8,950,985 B2 | 2/2015 | Durand-Terrasson | |
| 9,056,357 B2 | 6/2015 | Bozkurt | |
| 9,216,461 B2 * | 12/2015 | Athad | B23C 5/08 |
| 9,283,624 B2 | 3/2016 | Freyermuth et al. | |
| 9,623,494 B2 | 4/2017 | Bozkurt | |
| 10,464,138 B2 | 11/2019 | Kozaki et al. | |
| 10,799,960 B2 | 10/2020 | Zetek et al. | |
| 10,940,551 B1 * | 3/2021 | Semnisky | B23C 5/006 |
| 2005/0019110 A1 | 1/2005 | Astrakhan | |
| 2011/0182676 A1 | 7/2011 | Frank et al. | |
| 2011/0188954 A1 | 8/2011 | Frank | |
| 2013/0136551 A1 | 5/2013 | Nisikawa | |
| 2013/0156520 A1 | 6/2013 | Hacker et al. | |
| 2014/0161543 A1 | 6/2014 | Francis et al. | |
| 2019/0099816 A1 | 4/2019 | Zetek et al. | |
| 2019/0314903 A1 | 10/2019 | Haenle et al. | |
| 2019/0314904 A1 | 10/2019 | Haenle | |
| 2020/0055129 A1 * | 2/2020 | Leuze | B23D 77/006 |
| 2022/0023960 A1 * | 1/2022 | Ljatifi | B27G 13/002 |

FOREIGN PATENT DOCUMENTS

| | | | |
|---|---|---|---|
| DE | 10359854 A1 | 7/2005 | |
| DE | 102009022051 B3 | 9/2010 | |
| EP | 0074542 A2 | 3/1983 | |
| EP | 1 984 135 B1 | 10/2008 | |
| EP | 3772384 A1 | 2/2021 | |
| EP | 3819055 A1 * | 5/2021 | B23C 5/006 |
| FR | 2927555 A3 * | 8/2009 | B23B 29/03 |
| FR | 2967366 A1 * | 5/2012 | B23D 77/02 |
| JP | 2006015444 A * | 1/2006 | |
| JP | 4654622 B2 * | 3/2011 | |
| JP | 2017030075 A | 2/2017 | |
| JP | 2018149655 A | 9/2018 | |
| JP | 2018149656 A | 9/2018 | |
| WO | WO1987004969 A1 | 8/1987 | |
| WO | 2010/020234 A1 | 8/2009 | |
| WO | WO-2010097082 A1 * | 9/2010 | B23B 29/03417 |
| WO | WO2012101319 A1 | 8/2012 | |
| WO | WO2019002050 A1 | 1/2019 | |
| WO | WO2020118460 A1 | 6/2020 | |
| WO | WO2021023489 A1 | 2/2021 | |

OTHER PUBLICATIONS

Apr. 12, 2022 International Search Report WO App. No. PCT/US2021/062367.

Mar. 30, 2022 International Search Report WO App. No. PCT/US2021/062322.

Jun. 6, 2022 Office action (3 months) (US Only) U.S. Appl. No. 17/115,997.

Nov. 5, 2020 Notice of Allowance—U.S. Appl. No. 16/557,533.

* cited by examiner

CUTTING TOOL WITH DIRECTED FLUID FLOW TO FACILITATE CHIP EVACUATION

CROSS NOTING TO RELATED APPLICATIONS

This application is related to application Ser. No. 16/557,533, filed on Aug. 30, 2019, the entire contents of which are incorporated herein by reference.

FIELD OF THE DISCLOSURE

In general, the invention relates to cutting tools, and more particularly, to a lightweight cutting tool, such as a reamer, and the like, with a fluid dynamic structure, such as airfoil-shaped arms, that directs the flow of fluid in a desired direction to facilitate chip evacuation during a cutting operation.

BACKGROUND OF THE DISCLOSURE

During a cutting operation, it is essential to remove chips from the cutting zone. It has been observed that a reamer, for example, may have difficulties evacuating chips from the cutting zone, particularly when machining a blind hole.

SUMMARY OF THE DISCLOSURE

The problem of the evacuation of chips from the cutting zone in a cutting tool, such as a reamer, and the like, can be solved by providing one or more arms with a fluid dynamic structure having a cross sectional shape similar to an airfoil, turbine blade, and the like, that facilitates chip evacuation both mechanically and fluid dynamically.

The fluid dynamic structure defined by the one or more arms that support the cutting head can facilitate chip evacuation by multiple methods. First, the arms can mechanically "shovel" the chips away from the cutting edge in a similar fashion to flutes in a drill. Second, the arms function as a fluid dynamic structure similar to an airfoil. The work generated by rotating the tool causes the fluid to exert a downward force on the arms and the arms to exert an equal upward force on the air, which results in fluid flow directed towards the rear machine connection. The efficiency of the fluid flow can be improved when machining blind holes by adding additional spokes that act as a turbine blade. These turbine blades are designed to draw fluid into the hole from the hole entrance (near the machine spindle), which will flow through the center of the tool, to the bottom of the hole (near the front of the tool). When fluid exits the center of the tool at the bottom of the hole, it will be drawn up and out of the hole by the fluid dynamic style arms that support the cutting region. In addition, the fluid dynamic structures in the form of airfoil shaped arms/blades may also be used on the outer diameter of the tool purely to generate fluid flow without being used to support a cutting or guide pad region. Fluid flow can also be directed by closing the exit at the center of the cutting tool and replacing this exit with multiple exits that lead to the cutting edge, thereby using a combination of machine fluid and the airfoil shaped arms/blades to direct the fluid flow to facilitate chip evacuation.

In one aspect, a cutting tool comprises a front cutting ring including a sleeve member and one or more cutting head assemblies. Each cutting head assembly includes a leading support arm extending radially outwardly from the sleeve member, a trailing support arm extending radially outwardly from the sleeve member, and a cutting head supported by the leading support arm and the trailing support arm. At least one of the leading support arm and the trailing support arm of the cutting head assembly comprises a fluid dynamic structure for directing fluid flow in an axially rearward direction along an exterior of the center tube, thereby enhancing chip evacuation during a cutting operation.

In another aspect, a cutting tool comprises a front cutting body; a rear machine connection member; a center tube having a front end and a rear end; a front cutting ring secured to the front end of the center tube and the front cutting body; and a rear cutting ring secured to the rear end of the center tube and the rear machine connection member. The front cutting ring comprises a sleeve member and one or more cutting head assemblies, each cutting head assembly including a leading support arm extending radially outwardly from the sleeve member, a trailing support arm extending radially outwardly from the sleeve member, and a cutting head supported by the leading support arm and the trailing support arm. The rear cutting ring comprises a sleeve member and one or more cutting head assemblies, each cutting head assembly including a leading support arm extending radially outwardly from the sleeve member, a trailing support arm extending radially outwardly from the sleeve member, and a cutting head supported by the leading support arm and the trailing support arm. At least one of the leading support arm and the trailing support arm of the front cutting ring and at least one of the leading support arm and the trailing support arm of the rear cutting ring comprises a fluid dynamic structure for directing fluid flow in an axially rearward direction along an exterior of the center tube, thereby enhancing chip evacuation during a cutting operation.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE DISCLOSURE

Figure 1:
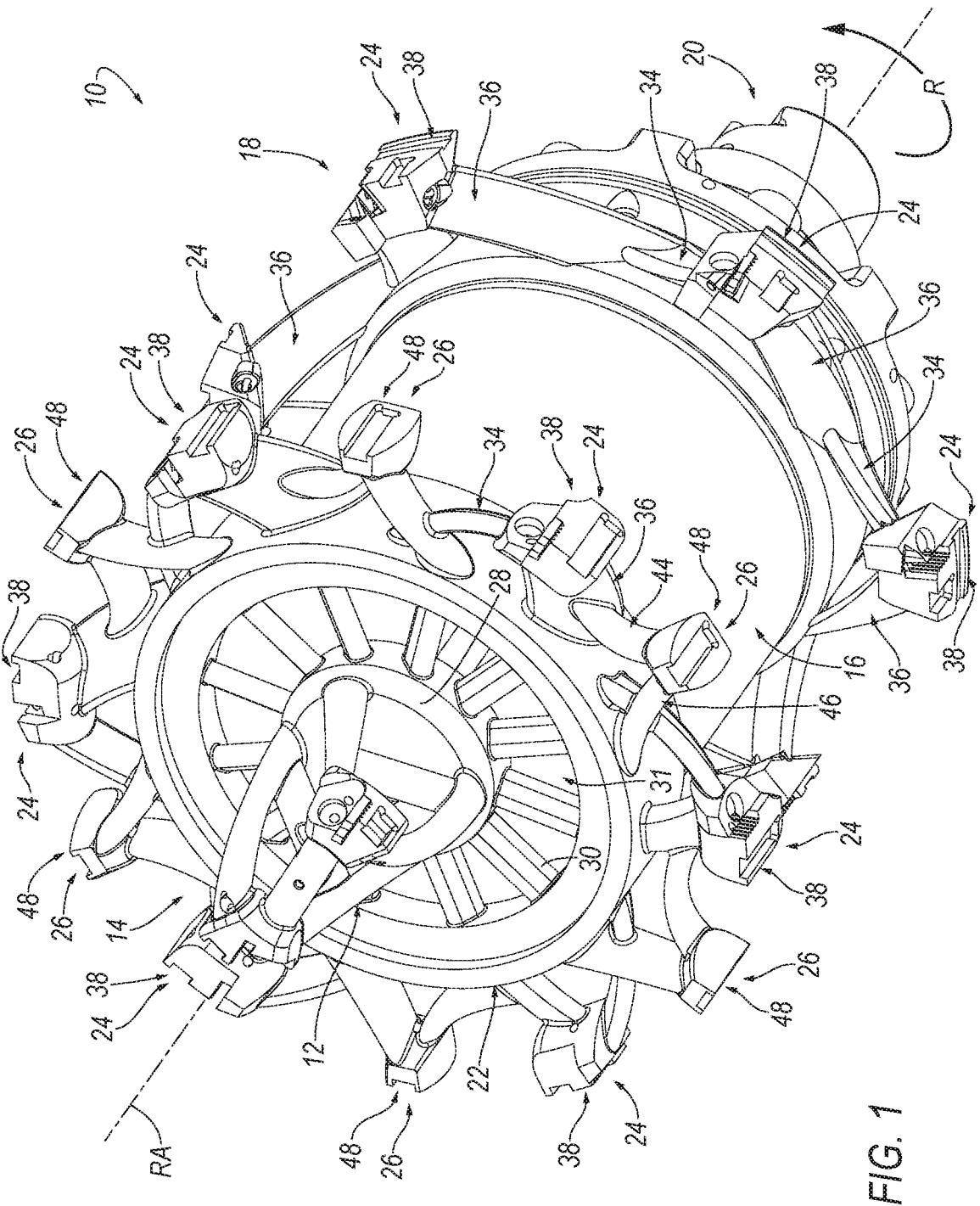
FIG. 1 is a front perspective view of a cutting tool, such as a lightweight reamer, according to an embodiment of the invention.

Referring now to FIGS. 1-5, a cutting tool 10 is shown according to an embodiment of the invention. In the illustrated embodiment, the cutting tool comprises a reamer with directed fluid flow that rotates in the direction, R, about a central, rotational axis, RA, during operation. Although the cutting tool 10 comprises a reamer in the illustrated embodiment, it should be appreciated that the principles of the invention can be applied to any cutting tool for cutting operations, such as a milling cutter, and the like. In addition, the description herein of specific applications should not be a limitation on the scope and extent of the use of the cutting tool.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this invention pertains.

For purposes of this specification (other than in the operating examples), unless otherwise indicated, all numbers expressing quantities and ranges of ingredients, process conditions, etc., are to be understood as modified in all instances by the term "about". Accordingly, unless indicated to the contrary, the numerical parameters set forth in this specification and attached claims are approximations that can vary depending upon the desired results sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, the term "elongate" is defined as something that is longer than it is wide. In other words, the width is smaller than its length.

As used herein, the term "circular" is defined as an object having a shape of a circle, i.e., an object having a simple closed shape. It is the set of points in a plane that are at a given distance from a given point, the center; equivalently it is the curve traced out by a point that moves in a plane so that its distance from a given point is constant. The distance between any of the points and the center is called the radius.

As used herein, the term "3D printing" is any of various processes in which material is joined or solidified under computer control to create a three-dimensional object, with material being added together, such as liquid molecules or powder grains being fused together, typically layer by layer. In the 1990s, 3D printing techniques were considered suitable only to the production of functional or aesthetical prototypes and, back then, a more comprehensive term for 3D printing was rapid prototyping. Today, the precision, repeatability and material range have increased to the point that 3D printing is considered as an industrial production technology, with the official term of "additive manufacturing".

As used herein, the term "hole" is defined as an opening trough something; a gap; a cavity or an aperture that can have any cross-sectional shape.

As used herein, the phrase "fluid dynamic structure" is defined as any structure that produces a fluid dynamic force, such as fluid flow, when the structure moves through a fluid.

One example of a fluid dynamic structure is an airfoil. Another example of a fluid dynamic structure is a turbine blade.

As used herein, the term "airfoil" is defined as the cross-sectional shape of a fluid dynamic structure, such as a wing, blade, sail, and the like.

As used herein, the term "fluid" is defined as a substance that has no fixed shape and yields easily to external pressure, such as a gas or a liquid.

Referring to FIGS. 1-5, the cutting tool 10 with directed fluid flow of the invention has five basic components:
1) a front cutting body 12;
2) a first, front cutting ring 14;
3) a center tube 16;
4) a second, rear cutting ring 18; and
5) a rear machine connection member 20.

The five basic components can be fastened to each other by using any well-known means in the art, such as shrink fitting, brazing, soldering, welding, glue, epoxy, mechanical fasteners, and the like. Alternatively, one or more of the five basic components can be integrally formed using additive manufacturing (i.e., 3D printing).

Figure 4:
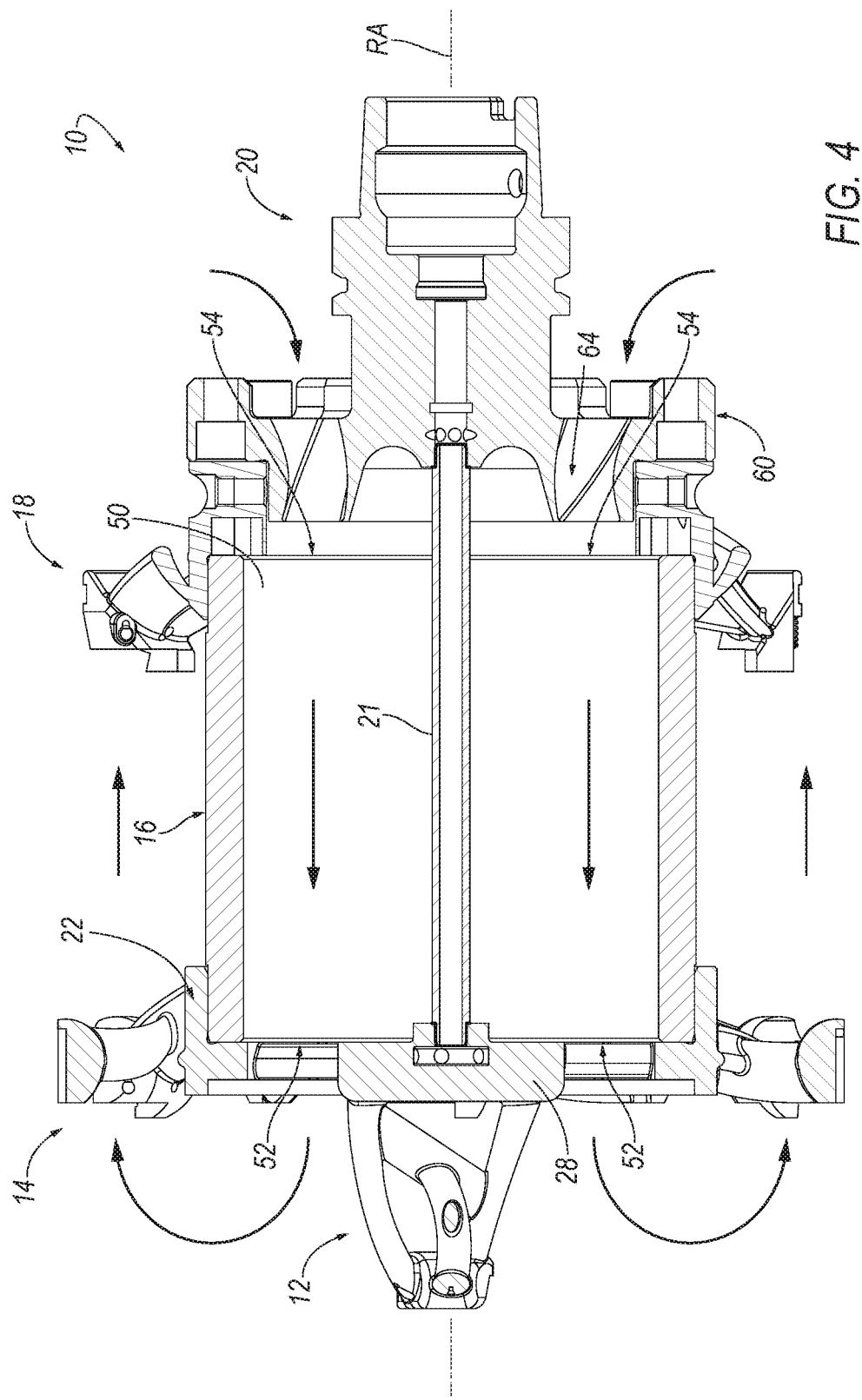
FIG. 4 is a cross-sectional view of the reamer of FIG. 1 taken along line 4-4 of FIG. 3.

In the illustrated embodiment, an optional fluid conduit 21 extends from the rear machine connection member 20 to the front cutting ring 14, as shown in FIG. 4. The optional fluid conduit 21 enables the cutting tool 10 to provide fluid, such as coolant, and the like, from the rear machine connection member 20 to the front cutting ring 14, and ultimately to the cutting insert/workpiece interface, as described in more detail below. In an alternate embodiment, the fluid conduit 21 can be eliminated and the center tube 16 can be formed by additive manufacturing to include a cavity for transporting fluid from the rear connection member 20 to the front cutting ring 14, as described in U.S. patent application Ser. No. 16/557,533, filed on Aug. 30, 2019, the entire contents of which are incorporated herein by reference.

Referring now to FIGS. 6-10, the front cutting ring 14 is shown according to an embodiment of the invention. It should be noted that the invention is not limited by the number of cutting rings, and that the invention can be practiced with only a single cutting ring, or more than two cutting rings.

It should be noted that the front cutting ring 14 is substantially identical to the rear cutting ring 18, except that the rear cutting ring 18 may have a slightly larger cutting diameter and the guide pad assemblies 26 may be omitted. Therefore, the rear cutting ring 18 will be described only briefly herein, and it will be appreciated that any description herein for the front cutting ring 14 also applies to the rear cutting ring 18.

In general, the front cutting ring 14 includes a sleeve member 22, a plurality of cutting head assemblies 24 and a plurality of guide pad assemblies 26. In the illustrated embodiment, the front cutting ring 14 has a total of six cutting head assemblies 24 and six guide pad assemblies 26, wherein each cutting head assembly 24 is separated by a guide pad assembly 26. It will be appreciated that the invention is not limited by the number of cutting head assemblies 24 and guide pad assemblies 26, and that the invention can be practiced with any desirable number of cutting head assemblies 24 and guide pad assemblies 26, depending on the physical size of the cutting tool 10. In addition, the invention can be practiced with the front cutting ring 14 having only the cutting head assemblies 24 and without the guide pad assemblies 26.

Figure 8:
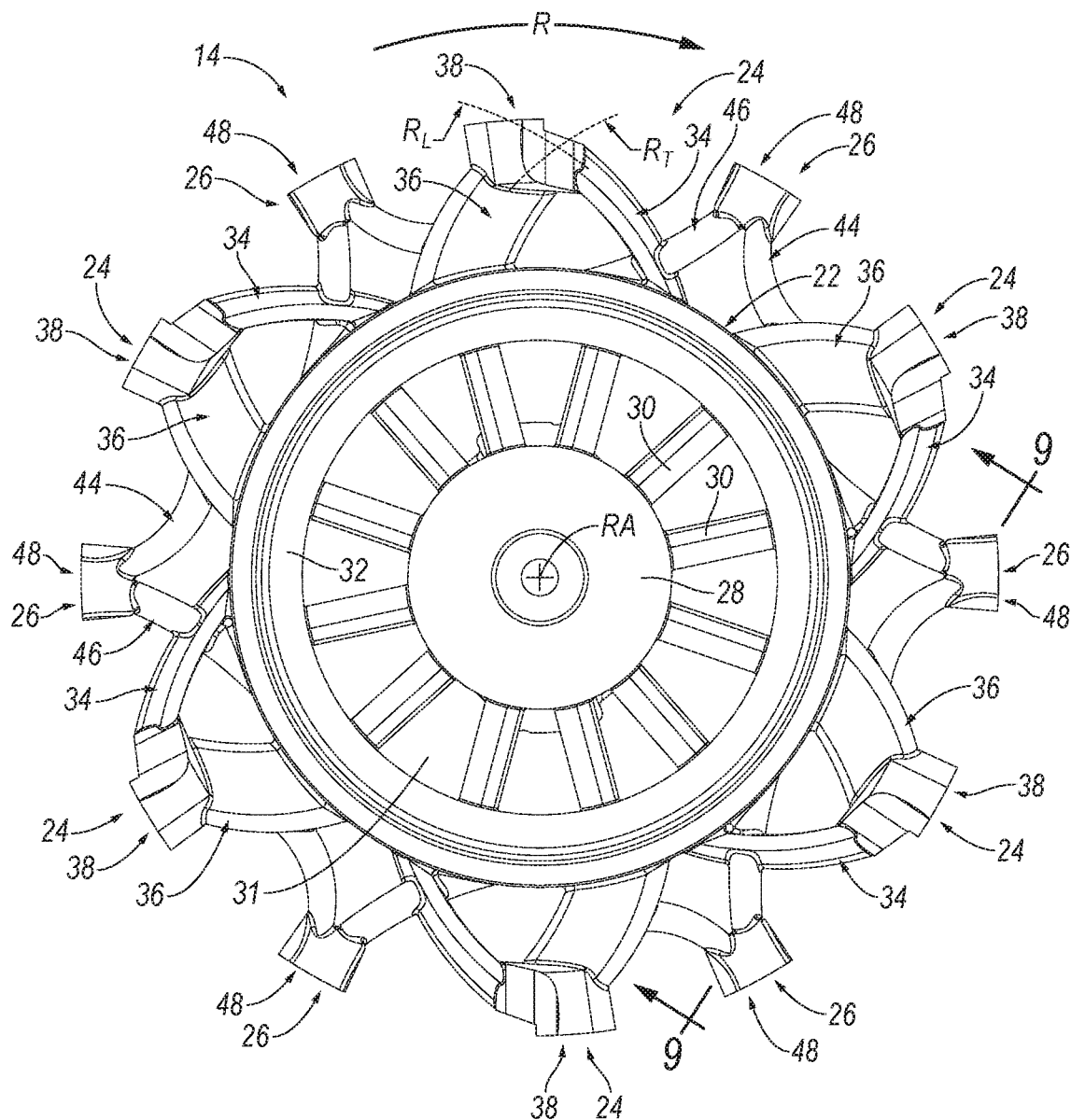
FIG. 8 is a rear view of the front cutting ring of FIG. 7.

As shown in FIG. 8, for example, the cutting head assemblies 24 are spaced apart from each other about the perimeter of the sleeve member 22. In the illustrated embodiment, the cutting head assemblies 24 are generally unequally spaced about the perimeter of the sleeve member 22. However, it should be appreciated that the cutting head assemblies 24 can be equally spaced about the perimeter of the sleeve member 22.

The front cutting ring 14 can be made of any material with suitable strength to withstand cutting forces based on the application, such as tool steel, aluminum, and the like, using an additive manufacturing (i.e., 3D printing) process. In one embodiment, the front cutting ring 14 has a unitary construction in which the plurality of cutting head assemblies 24 and the plurality of guide pad assemblies 26 are integrally formed with the sleeve member 22. In an alternative embodiment, one or all of the cutting head assemblies 24 and guide pad assemblies 26 can be separately attached to the sleeve member 22.

The front cutting ring 14 also includes a central hub 28 with a plurality of spokes 30 extending radially outward from the central hub 28 to the sleeve member 22. Each spoke 30 may comprise a fluid dynamic structure, such as an airfoil, a turbine blade, and the like, to produce a fluid flow in an axially forward direction from the rear of the cutting tool 10 to the front of the cutting tool 10, as indicated by the arrows shown in FIGS. 3 and 4.

Each cutting head assembly 24 includes a leading support arm 34 extending radially outwardly from the rotational axis, RA, a trailing support arm 36 extending radially outwardly from the rotational axis, RA, and a cutting head 38. In the illustrated embodiment, the cutting head 38 includes a cutting insert pocket 40 and a guide pad pocket 42, as shown in FIG. 7.

In the illustrated embodiment, the leading support arm 34 and the trailing support arm 36 are secured directly to the sleeve member 22. However, the sleeve member 22 can extend the entire length between the front cutting ring 14 and the rear cutting ring 18 such that the center tube 16 can be eliminated. Oppositely, the sleeve member 22 can be eliminated and the center tube 16 can extend entirely between the front cutting ring 14 and the rear cutting ring 18. In this case, the arms 34, 36 can be directly secured to the center tube 16.

In the illustrated embodiment, a sleeve member 22 includes a flange 32 that extends radially inward. The flange 32 and sleeve member 22 secure and position the front cutting ring 14 axially and radially to the center tube 16. It should be noted that the front cutting body 12 is secured to the central hub 28 of the front cutting ring 14. However, the front cutting body 12 could be secured to the sleeve member 22, depending on the dimensions of the front cutting body 12.

Figure 6:
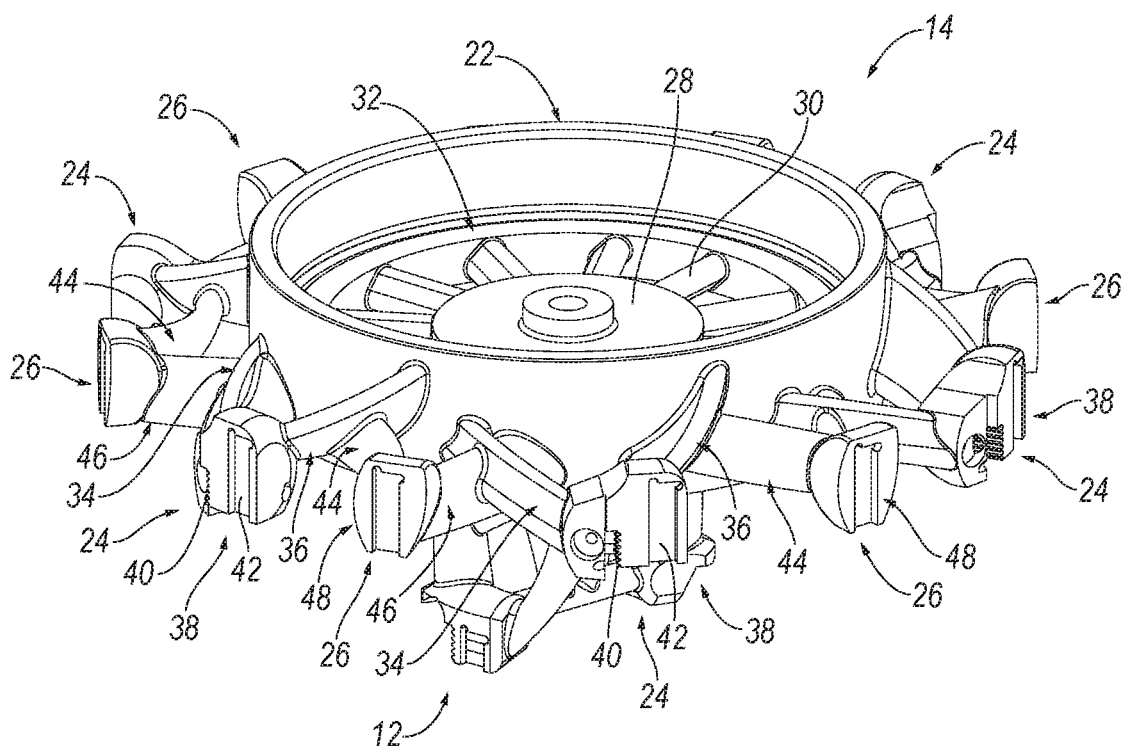
FIG. 6 is a perspective view of a front cutting ring of the reamer according to an embodiment of the invention, the rear cutting ring being substantially identical to the front cutting ring, except that the rear cutting ring may have a slightly larger cutting diameter and may not include guide pad assemblies.
Figure 7:
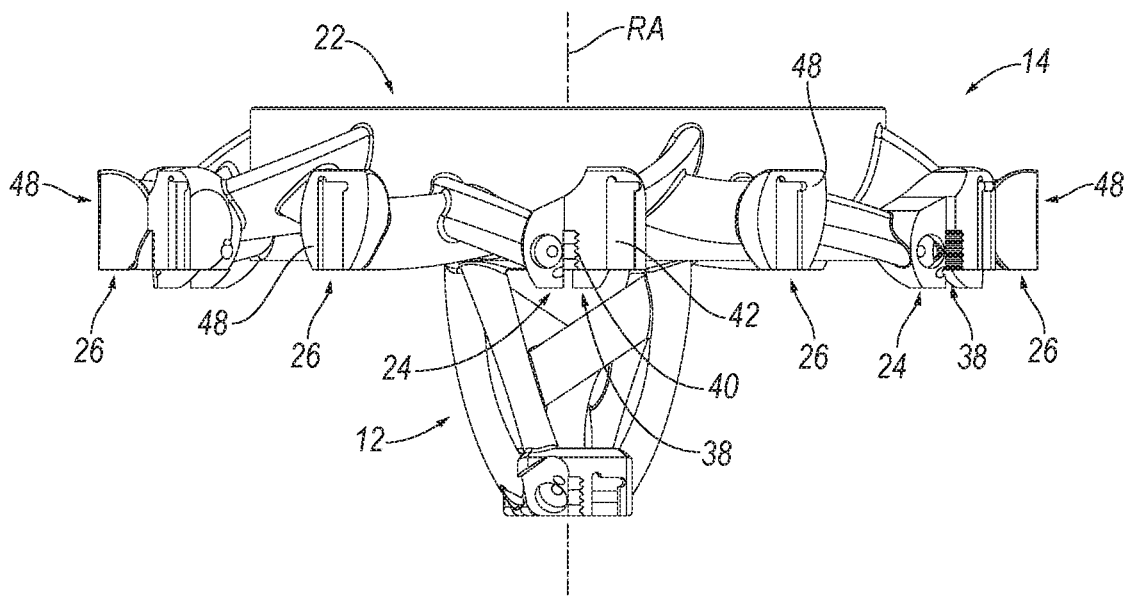
FIG. 7 is a side view of the front cutting ring of the reamer according to an embodiment of the invention.

As shown in FIGS. 6-8, the leading support arm 34 does not extend in a radial direction from the sleeve member 22 in a linear fashion, but in a curved fashion with a radius of curvature, $R_L$. Similarly, the trailing support arm 36 extends in a curved fashion from the sleeve member 22 with a radius of curvature, $R_T$. The radius of curvature, $R_L$, can be same or different in magnitude than the radius of curvature, $R_T$. In addition, the leading support arm 34 is curved in an opposite direction with respect to the trailing support arm 36. Specifically, the trailing support arm 36 curve in the same direction as the direction of rotation, R, (indicated by the arrow) of the cutting tool 10, and the leading support arm 34 curve in the opposite direction as the direction of rotation, R, of the cutting tool 10. It is noted that the leading support arm 34 of the rear cutting ring 18 is not curved in opposite direction as the direction of rotation, R.

In addition, the leading support arm 34 and the trailing support arm 36 sweep along a helical arc, as shown in FIGS. 6-8. Specifically, the amount of twist of the cross-section of each of the leading support arm 34 and the trailing support arm 36 varies along the length of each of the leading support arm 34 and the trailing support arm 36. The helical arc can be constant or variable. It should be noted that the helical arc of the leading support arm 34 may be the same magnitude or a different magnitude than the helical arc of the trailing support arm 36. For example, the leading support arm 34 may have a smaller helical arc than the trailing support arm 36. Also, it should be noted that the trailing support arm 36 spirals in an opposite direction than the leading support arm 34, as shown in FIG. 7. Thus, both the leading support arm 34 and the trailing support arm 36 curve downward in opposite directions with respect to the direction of rotation, R.

As shown in FIGS. 6 and 8, similar to the cutting head assembly 24, each guide pad assembly 26 includes a leading support arm 44 extending radially outward from the rotational axis, RA, a trailing support arm 46 extending radially outward from the rotational axis, RA, and a guide pad head 48 capable of receiving a guide pad (not shown) thereon. As shown in FIGS. 5-8, the trailing support arm 36 of the cutting head assembly 24 is interconnected with the leading support arm 44 of an adjacent guide pad assembly 26. It is noted that the leading support arm 44 of the guide pad assembly 26 is not directly connected to the sleeve member 22 of the front cutting ring 14. Oppositely, the leading support arm 34 of the cutting head assembly 24 is interconnected with the trailing support arm 46 of a different adjacent guide pad assembly 26. This interlocking relationship between the cutting head assemblies 24 and the guide pad assemblies 26 helps maintain the spatial relationship between the cutting head assemblies 24 and the guide pad assemblies 26. In addition, this interlocking relationship between the cutting head assemblies 24 and the guide pad assemblies 26 increases the axial, radial and tangential stiffness to weight ratio of the cutting tool 10.

One aspect of the invention is that the cutting tool 10 provides directed fluid flow to enhance chip evacuation during a cutting operation. This is achieved by one or both of the leading and trailing support arms 34, 36 of the cutting head assembly 24 comprising a fluid dynamic structure. In addition, one or both of the leading and trailing support arms 44, 46 of the guide pad assembly 26 may comprise a fluid dynamic structure. In the illustrated embodiment, the fluid dynamic structure comprises an airfoil, a turbine blade, and the like. However, it will be appreciated that the fluid dynamic structure can be any structure designed that produces a fluid dynamic flow when the structure moves through a fluid, such as machine fluid, air, and the like.

Some basic concepts of an airfoil will now be described. An airfoil has a suction surface (i.e., the upper surface), which is generally associated with higher velocity and lower static pressure. The airfoil produces a fluid dynamic force when the airfoil moves through a fluid, such as air, and the like. It should be understood that the component of this fluid dynamic force that is perpendicular to the direction of motion is called lift, and the component that is parallel to the direction of motion is call drag. In addition, an airfoil has a pressure surface (i.e., the lower surface), which has a comparatively higher static pressure than the suction surface. The pressure gradient between these two surfaces contributes to the lift force generated by the airfoil.

The geometry of the airfoil is described as follows: 1) the leading edge is the point at the front of the airfoil that has maximum curvature (i.e., minimum radius); 2) the trailing edge is defined similarly as the point of maximum curvature at the rear of the airfoil; 3) the chord line is the straight line connecting the leading and trailing edges. The chord length, or simply chord, c, is the length of the chord line. That is the reference dimension of the airfoil section.

The shape of the airfoil is defined using the following geometrical parameters: 1) the mean camber line or mean line is the locus of points midway between the upper and lower surfaces and its shape depends on the thickness distribution along the chord; 2) the thickness of an airfoil varies along the chord and it may be measured in either of two ways: a) thickness measured perpendicular to the camber line, sometimes described as the "American convention"; and b) thickness measured perpendicular to the chord line, sometimes described as the "British convention."

Referring back to FIGS. 3 and 4, the leading and trailing support arms 34, 36 of each cutting head assembly 24 and the leading and trailing support arms 44, 46 of each guide pad assembly 26 produce fluid flow in an axially rearward direction from the front of the cutting tool 10, along the outside of the center tube 16, toward the rear machine connection member 20 of the cutting tool 10, as indicated by the arrows. In addition, the spokes 30 of the front cutting ring 14 may comprise a fluid dynamic structure, such as an airfoil, a turbine blade, and the like, to produce an fluid flow in an axially forward direction from the rear of the cutting tool 10, through the center tube 16, through an opening 31 between the spokes 30 of the front cutting ring 14 and outward in the vicinity of the front cutting body 12, as indicated by the arrows in FIG. 4.

In an alternative embodiment, the opening 31 in the center of the front cutting ring 14 and the rear cutting ring 18 can be closed to prevent the flow of fluid through the center tube 16. However, similar to the earlier embodiment, the leading and trailing support arms 34, 36 of the cutting head assembly 24 produces a flow of fluid that is directed in an axially rearward direction along the outside of the center tube 16. In addition, the guide pad assembly 26 has a single arm 47 with a fluid dynamic structure.

As mentioned earlier, the fluid conduit 21 allows fluid to travel from the rear machine connection member 20 to the front cutting ring 14 of the cutting tool 10, as shown in FIG. 4. Specifically, the fluid conduit 21 allows fluid to travel through the central hub 28, through the spokes 30, and into the sleeve member 22 of the front cutting ring 14. The central hub 28 and each spoke 30 may have a hollow interior to enable a fluid, such as air, machining coolant, and the like, to travel from the fluid conduit 21 and into the central hub 28, pass through one or more spokes 30, into the sleeve member 22, and into one or more arms 34, 36 of each cutting head assembly 24 and/or into one or more arms 44, 46 of each guide pad assembly 26.

As seen in FIG. 8, one or more spokes 30 are radially aligned with a trailing support arm 36 of each cutting head assembly 24. Thus, in the illustrated embodiment, fluid can travel from the central hub 28, through the one of more spokes 30, through the sleeve member 22, and directly into a respective trailing support arm 36 of the cutting head assembly 24. However, it will be appreciated that the invention is not limited to only providing fluid to the trailing support arm 36 of the cutting head assembly 24, and that the invention can be practiced with providing fluid to the leading support arm 34 of the cutting head assembly 24, and/or the leading and/or trailing support arms 44, 46 of the guide pad assembly 26.

Figure 9:
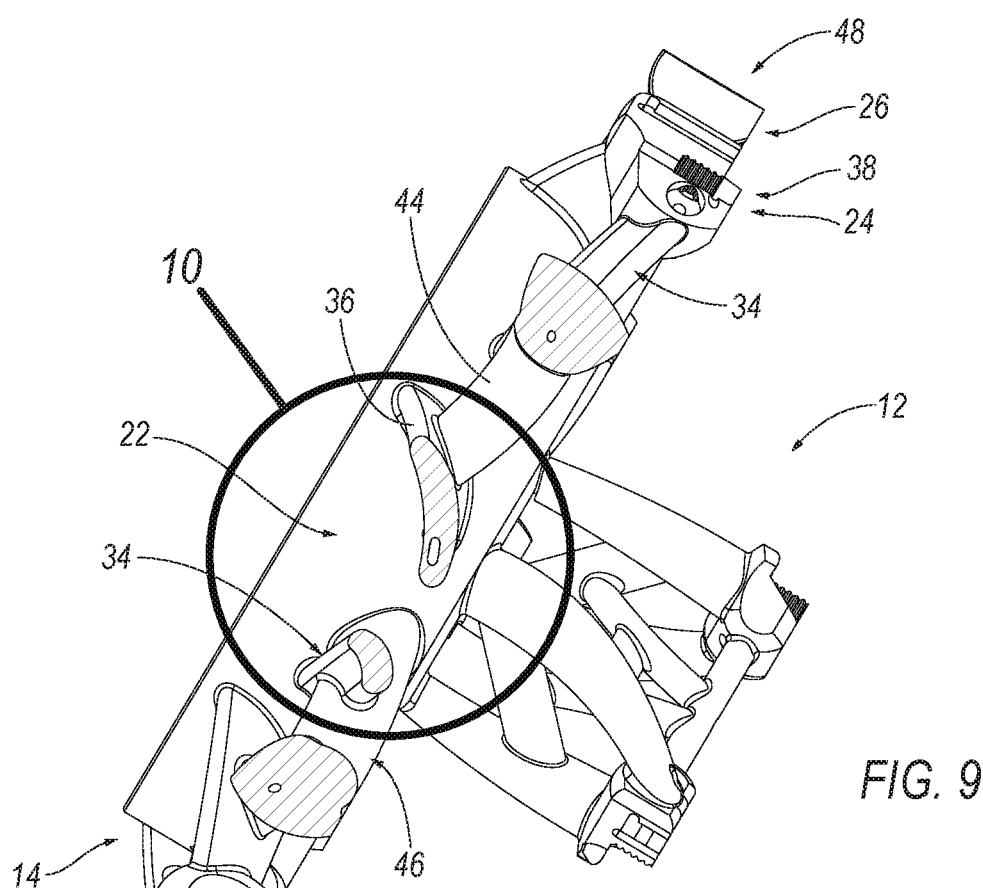
FIG. 9 is a cross-sectional view of the leading support arm and the trailing support arm of the front cutting ring taken along line 9-9 of FIG. 8.
Figure 10:
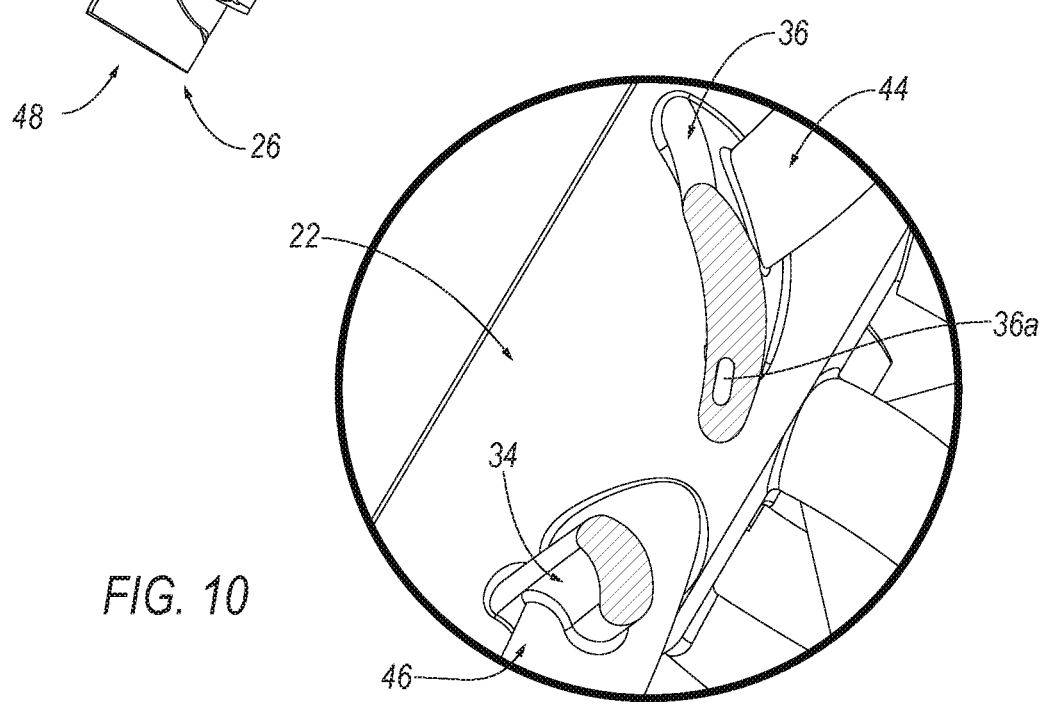
FIG. 10 is an enlarged view of the leading support arm and the trailing support arm of the front cutting ring of FIG. 9.
Figure 11:
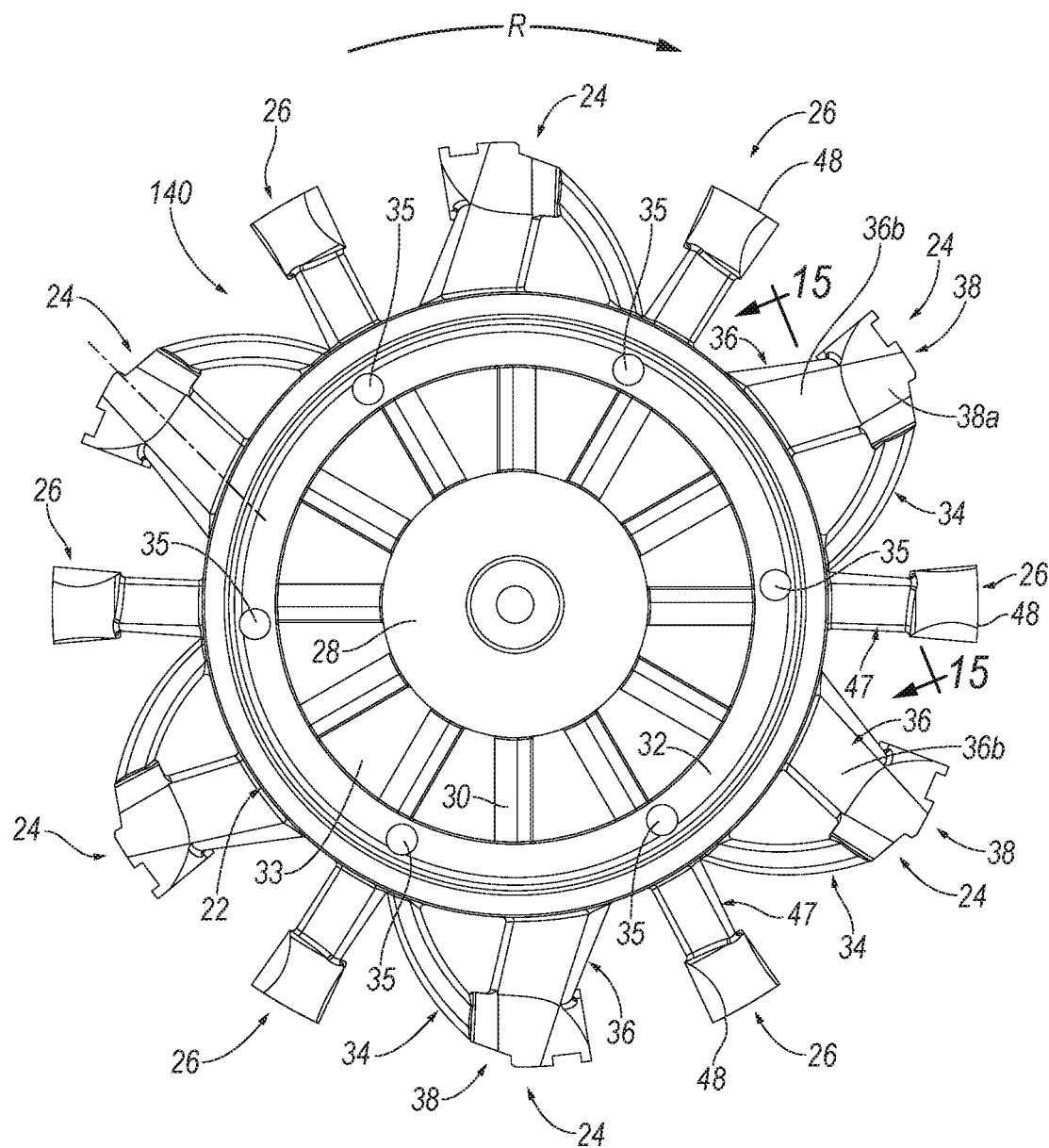
FIG. 11 is a rear view of a front cutting ring according to an alternate embodiment of the invention.
Figure 12:
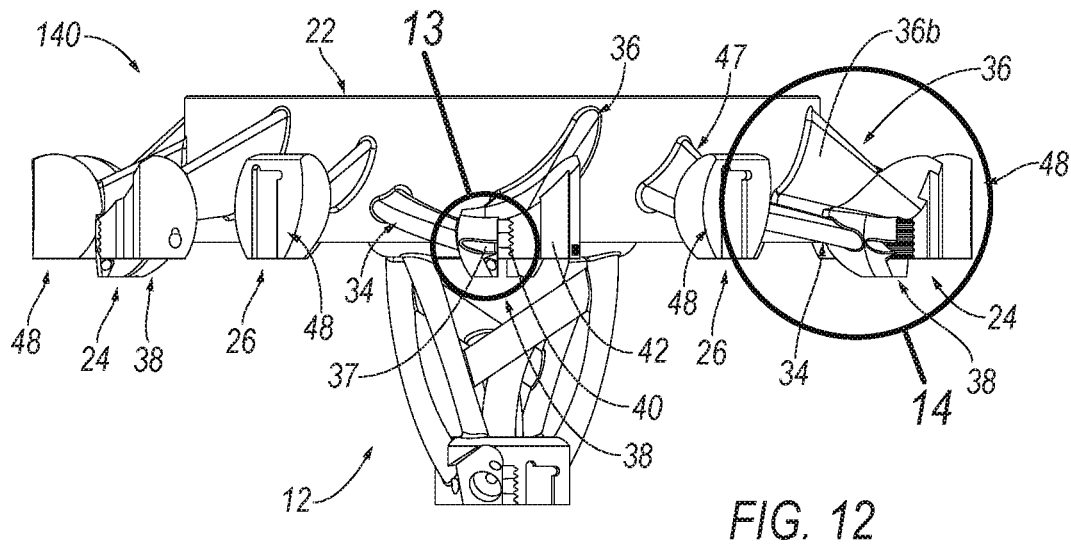
FIG. 12 is a side view of the front cutting ring of FIG. 11.

Referring now to FIGS. 9 and 10, the hollow interior of the trailing support arm 36 of the cutting head assembly 24 defines a fluid channel 36a. In the illustrated embodiment, the fluid channel 36a has a non-circular cross-sectional shape. However, it should be appreciated that the fluid channel 36a can have any desirable cross-sectional shape to optimize the flow rate of fluid through the arm. In addition, it should be appreciated that the fluid channel 36a of the front cutting ring 14 can also be provided in the trailing support arm 36 of the rear cutting ring 18. In addition, a fluid channel (not shown) can be also provided in the trailing support arm 46 of the guide pad assembly 26. Further, it should be appreciated that other combinations of the fluid channels 36a used to transport fluid within the front cutting ring 14 and the rear cutting ring 18 are within the scope of the invention. It should be appreciated that a fluid channel (not shown) can be provided in the leading support arm 34 of the cutting head assembly 24 and/or the leading support arm 44 of the guide pad assembly 26.

Figure 5:
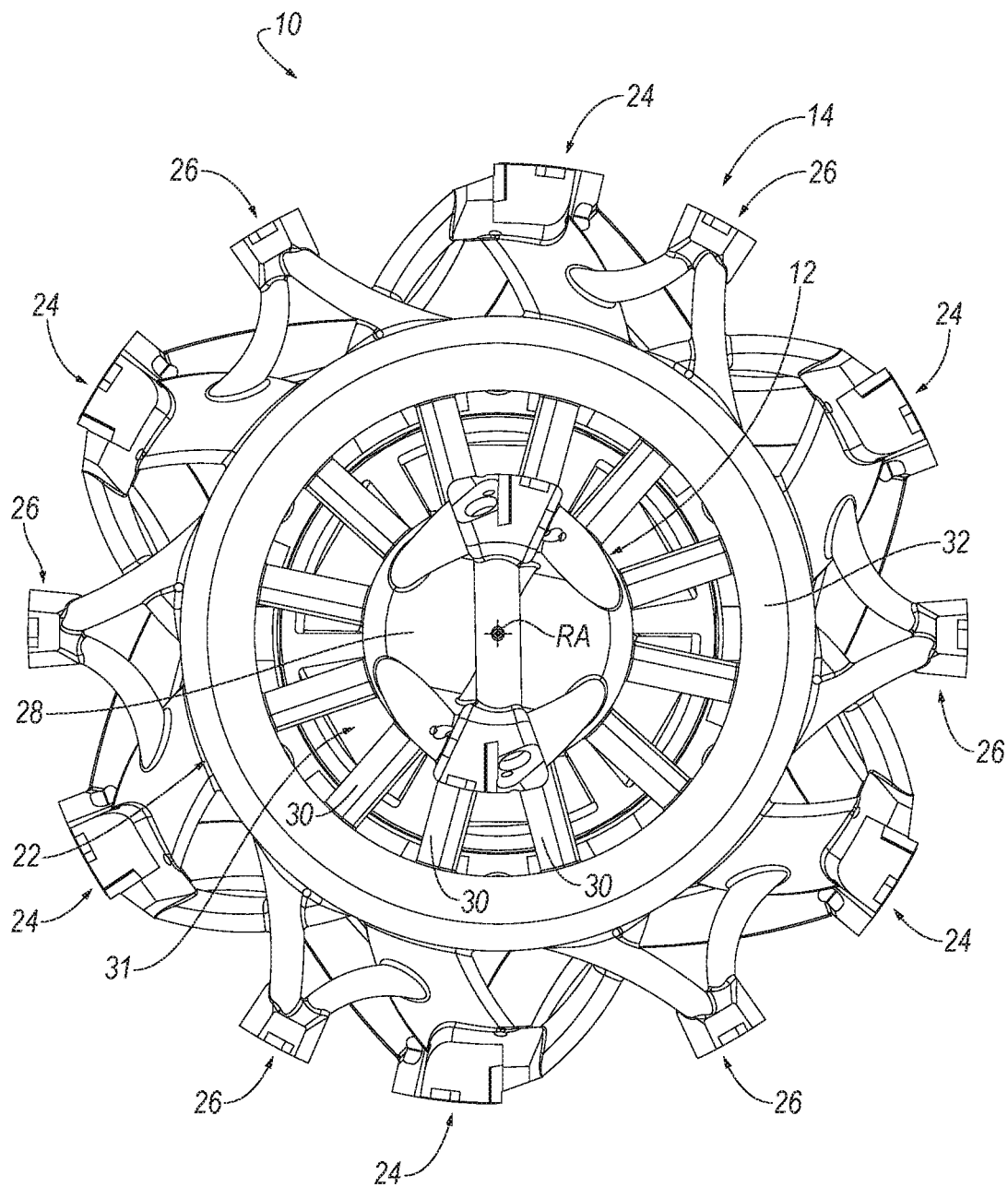
FIG. 5 is a front view of the reamer of FIG. 1.

As mentioned above, the trailing support arm 36 of the cutting head assembly 24 is interconnected with the leading support arm 44 of an adjacent guide pad assembly 26, and the leading support arm 34 of the cutting head assembly 24 is interconnected with the trailing support arm 46 of a different adjacent guide pad assembly 26, as shown in FIGS. 5-7. However, the invention is not limited by the interconnecting relationship between the leading and trailing support arms 34, 36, 44, 46 of the cutting head and guide pad assemblies 24, 26, and that the invention can be practiced without this interconnecting relationship.

Figure 13:
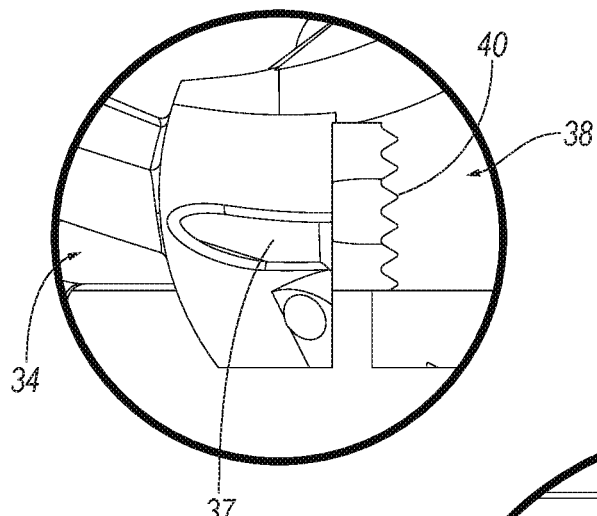
FIG. 13 is an enlarged view of the leading support arm of the cutting head assembly of FIG. 12 showing an exit hole for fluid near the cutting insert/workpiece interface.

Referring now to FIGS. 11-16, a front cutting ring 140 is shown according to an alternate embodiment of the invention. In this embodiment, the leading support arms and trailing support arms 34, 36 of the cutting head assemblies 24 are not interconnected with each other. In addition, the guide pad assemblies 26 only has a single arm 47 in the form of a fluid dynamic structure, such as an airfoil, and the like. Further, the opening 31 between the spokes 30 of the front cutting ring 14 is replaced with a solid structure 33 in the front cutting ring 140 to prevent fluid flow between the spokes 30. Rather, the front cutting ring 140 has one or more inlet holes 35 to allow the flow of fluid from the center tube 16 (see FIG. 4) to enter the inlet hole 35 and flow through the hollow interior of the sleeve member 22 and into a fluid duct 34a within the leading support arm 34 of the cutting head assembly 24. The fluid exits the fluid duct 34a through an exit hole 37 near the cutting insert/workpiece interface, as shown in FIG. 13. It will be appreciated that the solid structure 33 can be replaced with the opening 31 to allow the flow of fluid between the spokes 30, as in the earlier embodiment shown in FIG. 8.

Figure 14:
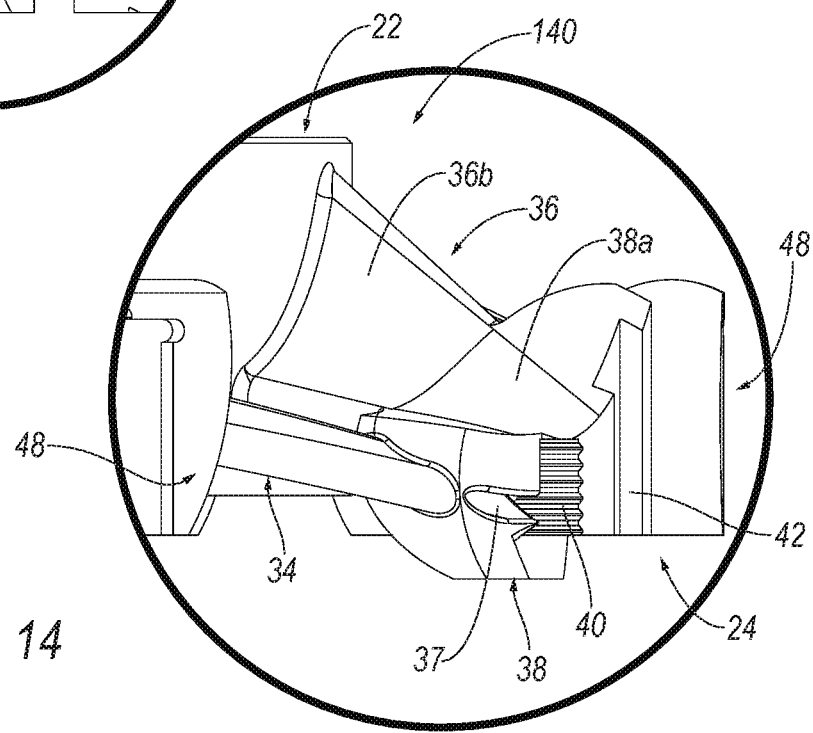
FIG. 14 is an enlarged view of the mechanical shovel feature of the front cutting ring of FIG. 12.
Figure 15:
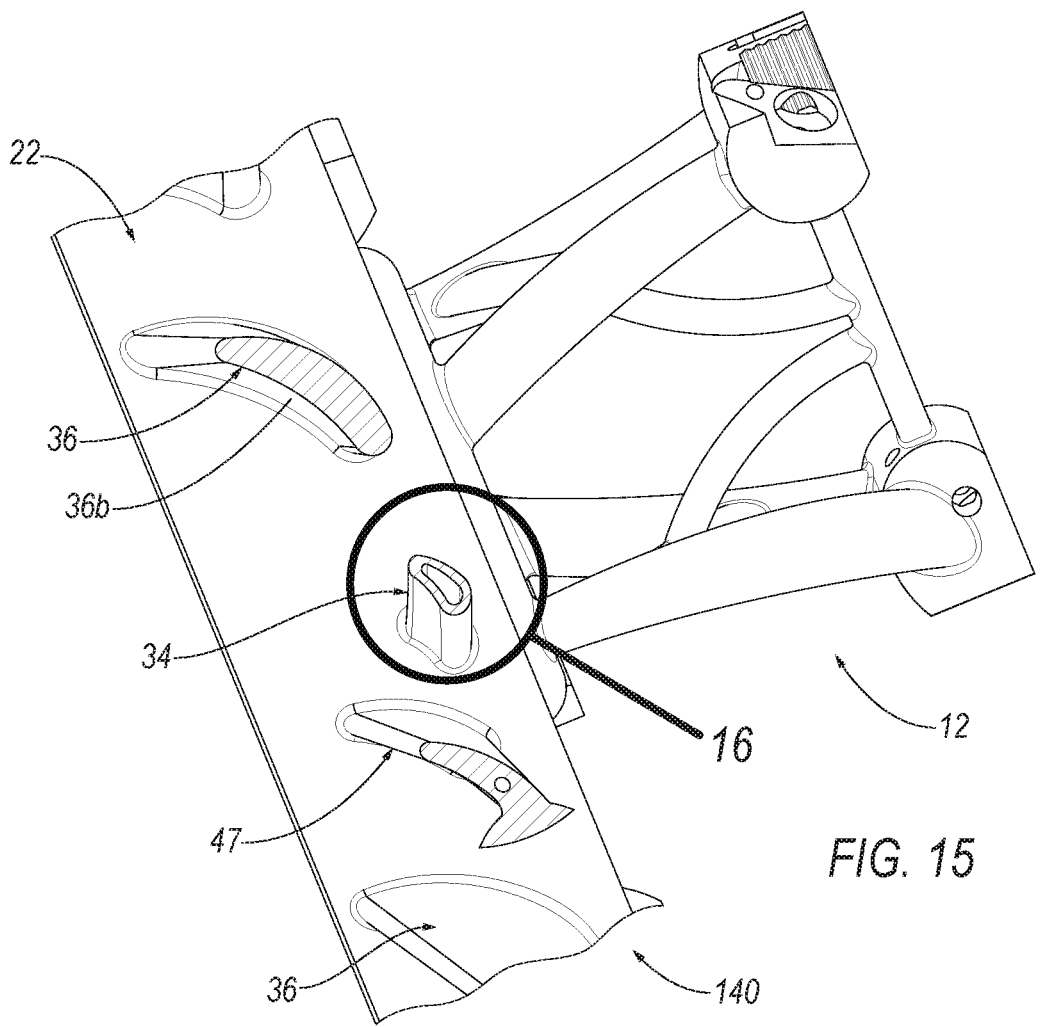
FIG. 15 is a cross-sectional view of the leading support arm and the trailing support arm of the front cutting ring taken along line 15-15 of FIG. 11 showing the fluid duct of the leading support arm.
Figure 16:
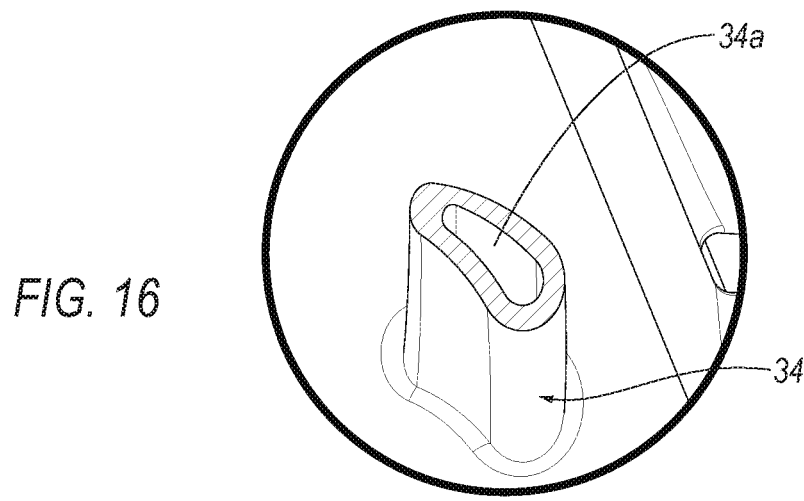
FIG. 16 is an enlarged view of the leading support arm of the front cutting ring of FIG. 15 showing the fluid duct.

As mentioned earlier, the leading and trailing support arms 34, 36, of the cutting head assemblies 24 and the single arm 47 of the guide pad assemblies 26 of the front cutting ring 140 produce a flow of fluid directed from the front toward the rear of the cutting tool 10, thereby enhancing the evacuation of chips during a cutting operation. As shown in FIG. 14, the airfoil-shaped trailing support arm 36 of the cutting head assembly 24 has a concave surface 36b that cooperates with a concave surface 38a of the cutting head 38 to act as a mechanical shovel to further enhance the evacuation of chips during a cutting operation.

In the illustrated embodiment shown in FIGS. 11-16, fluid from the sleeve member 22 is transported only through the leading support arm 34 to the cutting insert/workpiece interface and the guide pad/workpiece interface. However, it will be appreciated that fluid channels in the trailing support arm 36 can be used to transport fluid to the cutting insert/workpiece interface and the arm 47 can be used to transport fluid to the guide pad/workpiece interface.

Referring back to FIG. 4, the center tube 16 is made of any material with suitable strength for its intended purpose, such as steel, CFRP, aluminum, and the like. In the illustrated embodiment, the center tube 16 can be made of any suitable material, such as carbon fiber, carbon fiber reinforced plastic (CFRP), and the like. The hollow interior of the center tube 16 forms a cavity 50 that can be used to transport fluid, such as air, and the like, from the rear machine connection member 20, through the center tube 16, to the front cutting ring 14, if desired. In the illustrated embodiment, the center tube 16 may be made using additive manufacturing (i.e., 3D printing) to reduce the weight of the cutting tool 10, or may be made by any other suitable manufacturing process, such as sintering, plasma sputtering, and the like.

It is noted that the front cutting ring 14 is attached to a front end 52 of the center tube 16 and the rear cutting ring 18 is attached an opposite, rear end 54 of the center tube 16 (FIG. 4). The center tube 16 can be attached to the front and rear cutting rings 14, 18 using any well-known means in the art. In one embodiment, for example, the front and rear cutting rings 14, 18 may be glued to the center tube 16. Once properly attached to the center tube 16, each of the front cutting ring 14 and the rear cutting ring 18 are in fluid communication with the center tube 16. Specifically, the sleeve member 22 of each of the front cutting ring 14 and the rear cutting ring 18 is in fluid communication with the center tube 16. It should be appreciated that the center tube 16 can be integrally formed with one or both the front and rear cutting rings 14, 18 using an additive manufacturing process.

Figure 17:
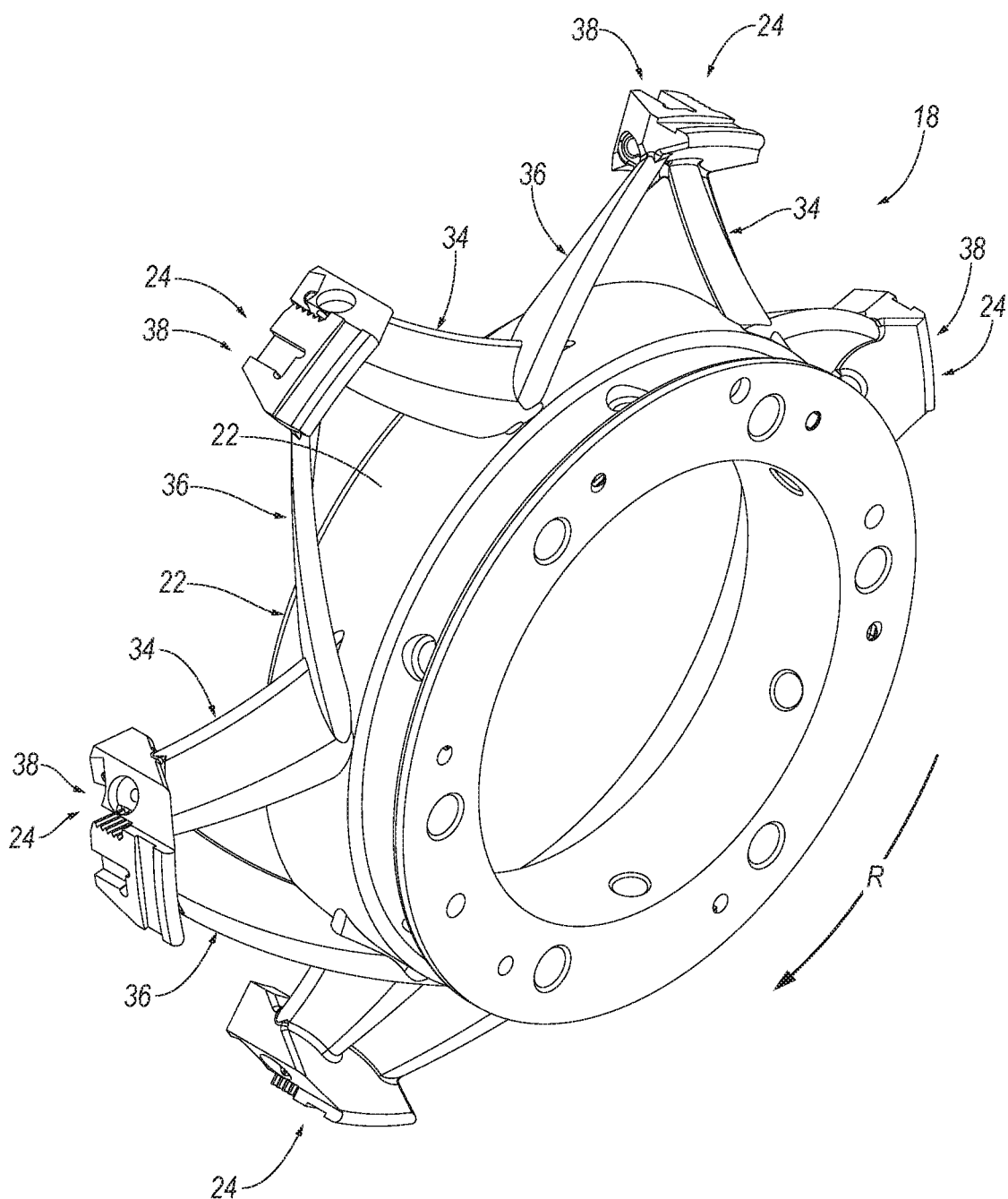
FIG. 17 is a rear perspective view of a rear cutting ring according to an embodiment of the invention.

Referring now to FIG. 17, the rear cutting ring 18 is shown according to an embodiment of the invention. The rear cutting ring 18 is similar to the front cutting ring 14, except the rear cutting ring does not include guide pad assemblies 26. However, it will be appreciated that the rear cutting ring 18 may include one or more guide pad assemblies 26, if desired.

In general, the rear cutting ring 18 includes a sleeve member 22 and a plurality of cutting head assemblies 24. In the illustrated embodiment, each cutting head assembly 24 is capable of having a guide pad pocket 42 (FIG. 12) for mounting a guide pad (not shown) therein. However, it will be appreciated that each cutting head assembly 24 may not include the guide pad pocket 42, if desired. In the illustrated embodiment, the rear cutting ring 18 has a total of six cutting head assemblies 24 (only five can be seen in FIG. 17). It will be appreciated that the invention is not limited by the number of cutting head assemblies 24, and that the invention can be practiced with any desirable number of cutting head assemblies 24, depending on the physical size of the cutting tool 10.

As shown in FIG. 17, for example, the cutting head assemblies 24 are spaced apart from each other about the perimeter of the sleeve member 22. In the illustrated embodiment, the cutting head assemblies 24 are generally unequally spaced about the perimeter of the sleeve member 22. However, it should be appreciated that the cutting head assemblies 24 can be equally spaced about the perimeter of the sleeve member 22.

Similar to the front cutting ring 14, the rear cutting ring 18 can be made of steel material, such as tool steel, using an additive manufacturing (i.e., 3D printing) process. In one embodiment, the rear cutting ring 18 has a unitary construction in which the plurality of cutting head assemblies 24 are integrally formed with the sleeve member 22. In an alternative embodiment, one or all of the cutting head assemblies 24 can be separately attached to the sleeve member 22.

Also similar to the front cutting ring 14, the leading and trailing support arms 34, 36 of each cutting head assembly 24 of the rear cutting ring 18 comprise a fluid dynamic structure, such as an airfoil, turbine blade, and the like. As a result, the leading and trailing support arms 34, 36 of each cutting head assembly 24 produce fluid flow in an axially rearward direction toward the rear machine connection member 20 of the cutting tool 10, as indicated by the arrows in FIGS. 3 and 4.

Figure 2:
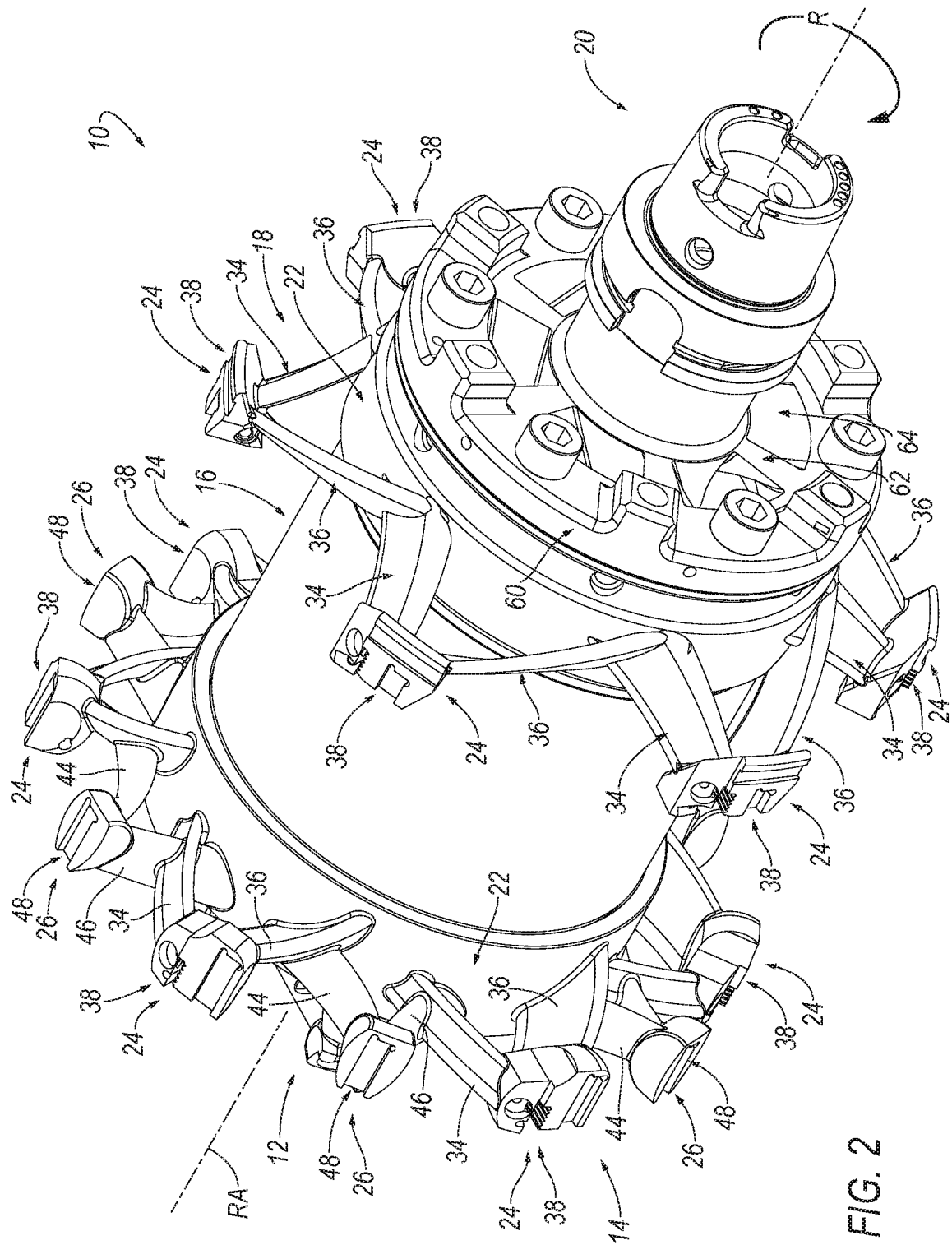
FIG. 2 is a rear perspective view of the lightweight reamer of FIG. 1.
Figure 3:
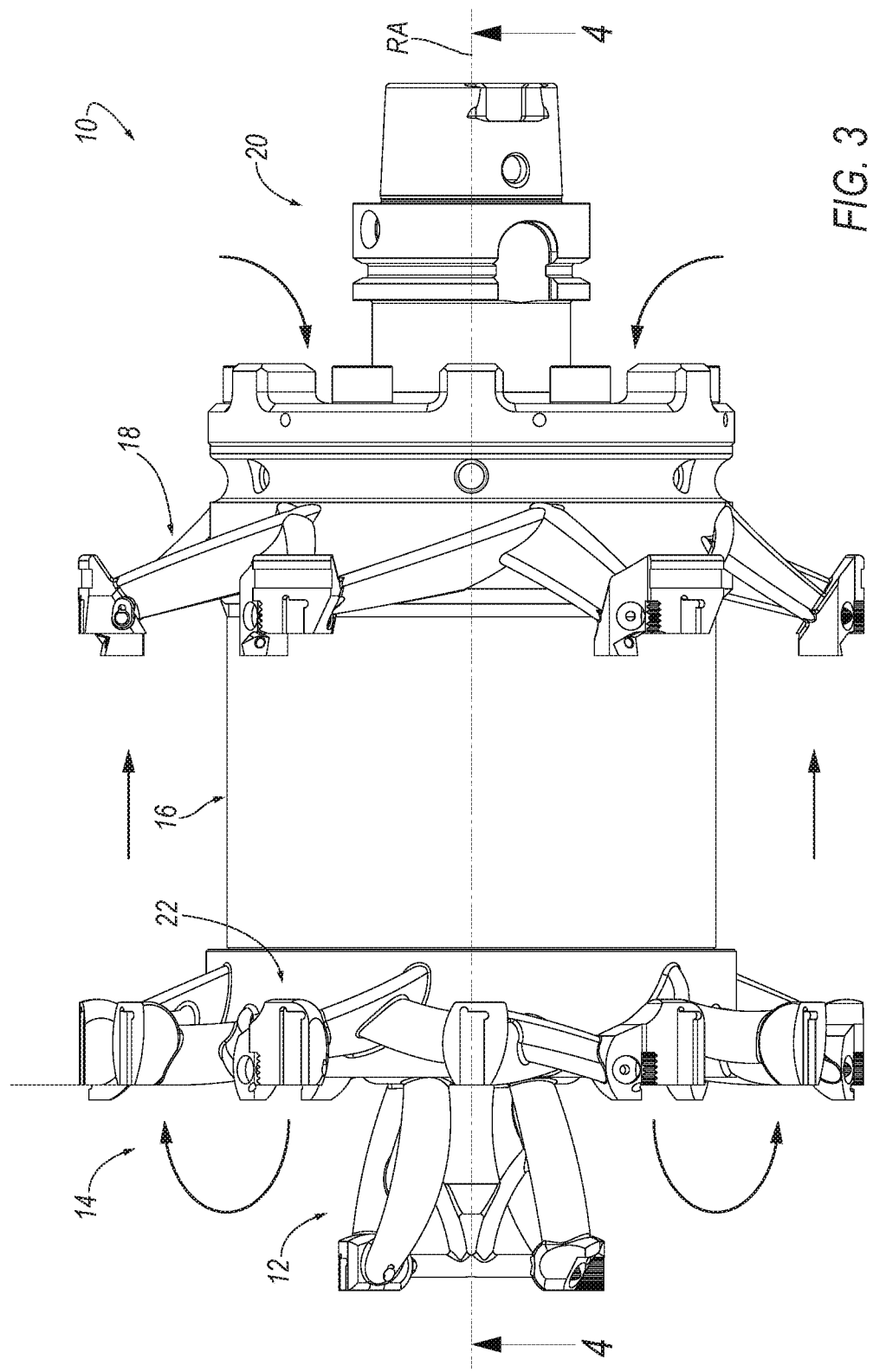
FIG. 3 is a side view of the lightweight reamer of FIG. 1.

The rear cutting ring 18 is connected to the rear machine connection member 20 and is also attached to the center tube 16 (FIGS. 1, 2 and 4). The rear cutting ring 18 receives fluid directly from the rear machine connection member 20. In turn, the rear machine connection member 20 can be coupled to a spindle assembly (not shown) for rotating the cutting tool 10 about the center, rotational axis, RA, and a fluid source (not shown) for providing pressurized fluid to the rear machine connection member 20.

Once the rear machine connection member 20 is in fluid communication with the fluid source, the fluid can be provided throughout the cutting tool 10 of the invention. Specifically, fluid entering the rear machine connection member 20 and can travel directly into the rear cutting ring 18. In addition, fluid can travel past the rear cutting ring 18, through the fluid conduit 21 and directly into the front cutting ring 14, into the cutting head assemblies 24 as described above, and exit proximate the cutting insert pocket 40 and the guide pad pocket 42 of each cutting head assembly 24.

In the embodiments described above, each cutting head assembly 24 of the front cutting ring 14 and the rear cutting ring 18 has a leading support arm 34, 44 and a trailing support arm 36, 46. However, it will be appreciated that the invention can be practiced with the cutting head assembly and/or guide pad assembly having only a single arm for supporting the cutting head and a single arm for supporting the guide pad head.

Figure 18:
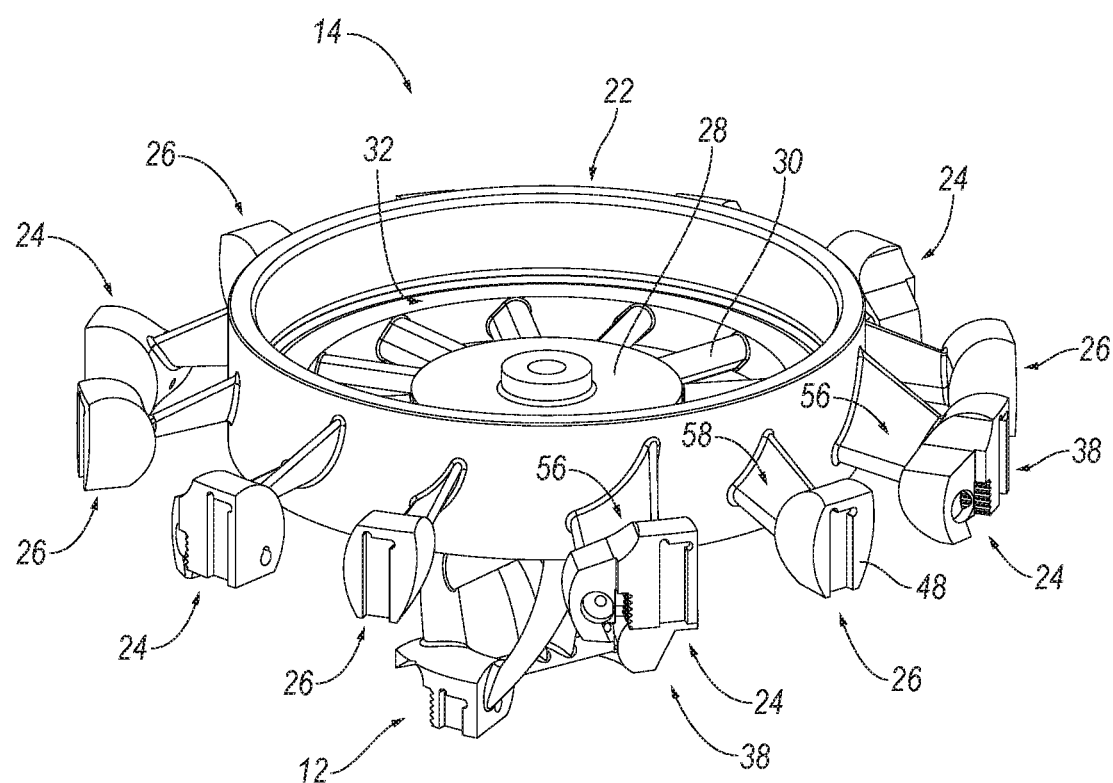
FIG. 18 is a perspective view of a cutting ring with a single supporting arm for each cutting head assembly and guide pad assembly according to an embodiment of the invention.

Referring now to FIG. 18, the cutting head assembly 24 of the front cutting ring 14 has only a single arm 56 for supporting the cutting head 38 and a single arm 58 for supporting the guide pad head 48. Similar to the earlier embodiment, the arms 56, 58 comprises a fluid dynamic structure for directing fluid flow in a desired direction to facilitate chip evacuation during a cutting operation.

Referring back to FIG. 2, the rear machine connection member 20 has a sleeve member 60 with a plurality of spokes 62 extending radially inward from the sleeve member 60. Each spoke 62 is separated by an opening 64 that allows fluid flow to pass through and into the center tube 16, as shown in FIG. 4. In addition, each spoke 62 can be a fluid dynamic structure, similar to the spokes 30 of the front cutting ring 14. In an alternate embodiment, the opening 64 may be closed to prevent fluid to pass into the center tube 16.

As described above, the fluid dynamic structure defined by the one or more arms 34, 36, 44, 46, 47, 56, 58 that support the cutting head 38 and the guide pad head 48 can facilitate chip evacuation by multiple methods. First, the arms 34, 36 supporting the cutting head 38 can mechanically "shovel" the chips away from the cutting edge in a similar fashion to flutes in a drill. Second, the arms 34, 36, 44, 46, 47, 56, 58 function as a fluid dynamic structure similar to an airfoil. The work generated by rotating the cutting tool 10 causes the fluid to exert a downward force on the arms 34, 36, 44, 46, 47, 56, 58 and cause the arms 34, 44, 46, 47, 56, 58 to exert an equal upward force on the fluid, which results in fluid flow directed towards the rear machine connection member 20.

The efficiency of the fluid flow can be improved when machining blind holes by adding the spokes 30, 62 that act as a turbine blade. These turbine blades are designed to draw fluid into the machined hole from the hole entrance (near the machine spindle), which will flow through the center tube 16 of the cutting tool 10, to the bottom of the machined hole (near the front of the cutting tool 10). When fluid exits the center of the cutting tool 10 at the bottom of the machined hole, the fluid will be drawn up and out of the machined hole by the airfoil style arms 34, 36, 44, 46, 47, 56, 58 that support the cutting region and guide pad.

In addition, the fluid dynamic structures in the form of airfoil shaped arms/blades 30, 34, 36, 44, 46, 47, 56, 58 may also be used on the outer diameter of the tool purely to generate fluid flow without being used to support a cutting or guide pad region. Fluid flow can also be directed by positioning the exit hole 37 near the cutting edge, using a combination of machine fluid and the airfoil shape arms to manipulate fluid flow to assist in chip evacuation, and using the airfoil arm geometry to create a compressor that will force fluid out of holes near the cutting edge of the cutting tool 10.

The patents and publications referred to herein are hereby incorporated by reference.

Having described presently preferred embodiments the invention may be otherwise embodied within the scope of the appended claims.

What is claimed is:

1. A cutting ring, comprising:
   a sleeve member; and
   one or more cutting head assemblies spaced apart from each other about a perimeter of the sleeve member, each cutting head assembly including at least one support arm extending radially outwardly from a rotational axis, RA, of the cutting tool, and a cutting head supported by the at least one support arm,
   wherein the at least one support arm comprises a fluid dynamic structure having a cross-sectional shape of an airfoil for directing fluid flow in a desired direction to facilitate chip evacuation during a cutting operation.

2. The cutting ring of claim 1, further comprising a central hub with a plurality of spokes extending radially outward from the central hub to the sleeve member, wherein at least one spoke comprises a fluid dynamic structure having a cross-sectional shape of an airfoil for directing fluid flow in the desired direction.

3. The cutting ring of claim 1, wherein the at least one support arm has a hollow interior defining a fluid duct capable of transporting fluid to a cutting insert/workpiece interface.

4. The cutting ring of claim 1, wherein the at least one support arm is formed with a helical arc.

5. The cutting ring of claim 1, wherein each cutting head assembly further comprises a leading support arm and a trailing support arm.

6. The cutting ring of claim 5, wherein the leading support arm extends radially outward from a sleeve member with a radius of curvature, $R_L$, and wherein the trailing support arm extends radially outward from the sleeve member with a radius of curvature, $R_T$.

7. The cutting ring of claim 6, wherein the trailing support arm curves in the same direction as a direction of rotation, R, of the cutting tool, and wherein the leading support arm curves in an opposite direction as a direction of rotation, R, of the cutting tool.

8. The cutting ring of claim 1, wherein the cutting ring further comprises one or more guide pad assemblies, each guide pad assembly including at least one support arm extending radially outward from the rotational axis, RA, and a guide pad head supported by the at least one support arm of each guide pad assembly.

9. The cutting ring of claim 8, wherein each guide pad assembly further comprises a leading support arm and a trailing support arm.

10. The cutting ring of claim 1, wherein the cutting ring further comprises a central hub and one or more spokes extending radially outward from the central hub.

11. The cutting ring of claim 10, wherein the one or more spokes comprises a fluid dynamic structure for directing fluid flow through an opening between the one or more spokes of the cutting ring.

12. The cutting ring of claim 1, wherein at least one support arm of the cutting head assembly has a concave surface that cooperates with a concave surface of the cutting head to act as a mechanical shovel to further facilitate the evacuation of chips during a cutting operation.

13. The cutting ring of claim 1, wherein the cutting head comprises an insert pocket for mounting a cutting insert therein.

14. A cutting ring comprising:
one or more cutting head assemblies, each cutting head assembly including at least one support arm extending radially outwardly from a rotational axis, RA, of the cutting tool, and a cutting head supported by the at least one support arm; and
one or more guide pad assemblies, each guide pad assembly including at least one support arm extending radially outward from the rotational axis, RA, and a guide pad head supported by the at least one support arm of each guide pad assembly,
wherein the at least one support arm of each cutting head assembly comprises a fluid dynamic structure for directing fluid flow in a desired direction to facilitate chip evacuation during a cutting operation, and
wherein the at least one support arm of each guide pad assembly comprises a fluid dynamic structure for directing fluid flow in a desired direction to facilitate chip evacuation during the cutting operation.

15. A cutting tool, comprising:
a front cutting body;
a rear machine connection member;
a center tube having a front end and a rear end;
a front cutting ring secured to the front end of the center tube and the front cutting body, the front cutting ring comprises one or more cutting head assemblies, each cutting head assembly including at least one support arm extending radially outwardly from a rotational axis, RA, of the cutting tool, and a cutting head supported by the support arm; and
a rear cutting ring secured to the rear end of the center tube and the rear machine connection member, the rear cutting ring comprises one or more cutting head assemblies, each cutting head assembly including at least one support arm extending radially outwardly from a rotational axis, RA, of the cutting tool, and a cutting head supported by the support arm,
wherein the at least one support arm of the front cutting ring comprises a fluid dynamic structure for directing fluid flow in a desired direction to facilitate chip evacuation during a cutting operation, and
wherein the at least one support arm of the rear cutting ring comprises a fluid dynamic structure for directing fluid flow in a desired direction to facilitate chip evacuation during a cutting operation.

16. The cutting tool of claim 15, wherein the at least one support arm of the cutting head assembly has a concave surface that cooperates with a concave surface of the cutting head to act as a mechanical shovel to further facilitate the evacuation of chips during a cutting operation.

17. The cutting tool of claim 15, wherein each cutting head assembly further comprises a leading support arm and a trailing support arm.

18. The cutting tool of claim 15, wherein the front cutting ring further comprises one or more guide pad assemblies, each guide pad assembly including at least one support arm extending radially outward from the rotational axis, RA, and a guide pad head supported by the at least one support arm of each guide pad assembly.

19. The cutting tool of claim 18, wherein the at least one support arm of the guide pad assembly comprises a fluid dynamic structure for directing fluid flow in a desired direction to facilitate chip evacuation during a cutting operation.

20. The cutting tool of claim 18, wherein each guide pad assembly further comprises a leading support arm and a trailing support arm.

21. The cutting tool of claim 15, wherein the desired direction comprises an axially rearward direction along an exterior of the cutting tool.

* * * * *